(12) United States Patent
Naito et al.

(10) Patent No.: US 12,395,040 B2
(45) Date of Patent: Aug. 19, 2025

(54) STATOR ASSEMBLY AND METHOD OF ASSEMBLING STATOR ASSEMBLY

(71) Applicant: Murata Manufacturing Co., Ltd., Nagaokakyo (JP)

(72) Inventors: Osamu Naito, Nagaokakyo (JP); Miyuki Furuya, Hamamatsu (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 168 days.

(21) Appl. No.: 18/313,439

(22) Filed: May 8, 2023

(65) Prior Publication Data

US 2023/0275488 A1    Aug. 31, 2023

Related U.S. Application Data

(63) Continuation of application No. PCT/JP2021/028087, filed on Jul. 29, 2021.

(30) Foreign Application Priority Data

Nov. 18, 2020  (JP) ................. 2020-191334

(51) Int. Cl.
*H02K 3/28* (2006.01)
*H02K 1/14* (2006.01)
(Continued)

(52) U.S. Cl.
CPC ............. *H02K 5/225* (2013.01); *H02K 1/146* (2013.01); *H02K 3/28* (2013.01); *H02K 15/026* (2013.01); *H02K 15/33* (2025.01)

(58) Field of Classification Search
CPC .......... H02K 3/28; H02K 21/14; H02K 11/33; H02K 3/04; H02K 3/522; H02K 3/47; H02K 1/2783; H02K 1/27
See application file for complete search history.

(56) References Cited

U.S. PATENT DOCUMENTS 9,837,869 B2 * 12/2017 Hashimoto ............ H02K 3/522
2015/0207374 A1 * 7/2015 Tsuiki ....................... H02K 3/28
                                                                    310/202

FOREIGN PATENT DOCUMENTS

JP    H09200991 A    7/1997
JP    2002101596 A   4/2002
(Continued)

OTHER PUBLICATIONS

International Search Report in PCT/JP2021/028087, mailed Oct. 12, 2021, 5 pages.

*Primary Examiner* — Leda T Pham
(74) *Attorney, Agent, or Firm* — ArentFox Schiff LLP

(57) ABSTRACT

A coil conductor of each of a U-phase, a V-phase, and a W-phase is provided with a configuration in which a terminal wiring conductor, a first tooth conductor wound around a first tooth, a bridging line conductor, a second tooth conductor wound around a second tooth, and a neutral-point connection conductor are connected in this order. The terminal wiring conductor is connected to the first tooth conductor at an upper side of an insulator. The bridging line conductor is disposed on an upper side of the insulator disposed on a stator core and along an outer side portion of a tooth of another phase. The neutral-point connection conductor is connected to the second tooth conductor at a lower side of the insulator.

20 Claims, 6 Drawing Sheets

(51) Int. Cl.
*H02K 5/22* (2006.01)
*H02K 15/026* (2025.01)
*H02K 15/33* (2025.01)

(56) References Cited

FOREIGN PATENT DOCUMENTS

| | | |
|---|---|---|
| JP | 2007-181324 A | 7/2007 |
| JP | 2008043106 A | 2/2008 |
| JP | 2011035947 A | 2/2011 |
| JP | 2012253978 A | 12/2012 |
| JP | 2018207767 A | 12/2018 |

\* cited by examiner

STATOR ASSEMBLY AND METHOD OF ASSEMBLING STATOR ASSEMBLY

CROSS REFERENCE TO RELATED APPLICATIONS

This application is a continuation of PCT Application No. PCT/JP2021/028087, filed Jul. 29, 2021, which claims priority to Japanese Patent Application No. 2020-191334, filed Nov. 18, 2020, the entire contents of each of which are hereby incorporated by reference in their entirety.

TECHNICAL FIELD

The present invention relates to a stator assembly for a three-phase brushless motor.

BACKGROUND

Japanese Unexamined Patent Application Publication No. 2012-253978 (hereinafter "Patent Document 1" describes a structure of a stator for a three-phase motor. The stator described therein includes twelve teeth arranged at predetermined angular intervals (30°). The twelve teeth are used in four for a U-phase, four for a V-phase, and four for a W-phase. Then, a U1 tooth for the U-phase, a U2 tooth for the U-phase, a V1 tooth for the V-phase, a V2 tooth for the V-phase, a W1 tooth for the W-phase, a W2 tooth for the W-phase, a U3 tooth for the U-phase, a U4 tooth for the U-phase, a V3 tooth for the V-phase, a V4 tooth for the V-phase, a W3 tooth for the W-phase, and a W4 tooth for the W-phase are arranged annularly (counterclockwise, for example) in this order.

Moreover, a wire conductor for the U-phase is wound around a tooth constituting the U-phase, a wire conductor for the V-phase is wound around a tooth constituting the V-phase, and a wire conductor for the W-phase is wound around a tooth constituting the W-phase.

The U-phase conductors for teeth not adjacent to each other among multiple teeth constituting the U-phase are connected by a U-phase bridging line (conductor), the V-phase linear conductors for teeth not adjacent to each other among teeth constituting the V-phase are connected by a V-phase bridging line (conductor), and the W-phase linear conductors for teeth not adjacent to each other among teeth constituting the W-phase are connected by a W-phase bridging line (conductor). Then, the U-phase conductor, the V-phase conductor, and the W-phase conductor each are connected to a neutral-point at a predetermined position of an annular structural body in which the multiple teeth are arranged.

In addition, the bridging line of each layer is tied to multiple pins provided on the structural body that are shaped to protrude from a top surface of the structural body and are arranged and spaced apart from each other along the annular shape.

However, in the configuration described in Patent Document 1, there exists inevitably a place where conductors having an electric potential difference cross, for example, where a W-phase bridging line (conductor) and a conductor connecting the V-phase conductor to the neutral-point cross, or the like. As a result, the insulation reliability of the stator decreases. Further, since a pin for tying a winding line is required, it is hard to reduce in height.

SUMMARY OF THE INVENTION

Accordingly, it is an object of the present invention to provide a stator assembly that is thin and has high insulation reliability.

In an exemplary aspect, a stator assembly is provided that includes a stator core including a back yoke disposed in an annular shape and multiple teeth extending toward a central axis of the annular shape. Moreover, an insulator made of an insulation material is disposed to sandwich the stator core from above and below, and a coil conductor is wound around portions of the insulator covering the multiple teeth.

In an exemplary aspect, the multiple teeth include a first tooth and a second tooth for each of the U-phase, the V-phase, and the W-phase, and the teeth of each phase are repeatedly arranged in order along an annular shape.

In an exemplary aspect, the coil conductor further includes a coil conductor for each of the U-phase, the V-phase, and the W-phase. The coil conductor for each phase is connected in the order of a terminal wiring conductor, a first tooth conductor wound around the first tooth, a bridging line conductor, a second tooth conductor wound around the second tooth, and a neutral-point connection conductor.

In another exemplary aspect, the terminal wiring conductor is connected to the first tooth conductor at an upper side of the insulator. Moreover, the bridging line conductor is disposed on an upper side of the insulator disposed on the stator core and is disposed along an outer side portion of a tooth of another phase.

In an exemplary aspect, the neutral-point connection conductor is connected to the second tooth conductor at a lower side of the insulator.

In the configurations of the exemplary aspects described above, a portion of the coil conductor of each phase on a side of a control signal application terminal (e.g., a side opposite to the neutral-point) and a portion connecting the coil conductors wound around the multiple teeth are separated from a portion of the coil conductor of each phase on a side connected to the neutral-point, sandwiching the stator core and the insulator. This configuration suppresses arrangement of conductors having a large electric potential difference in proximity to each other.

According to exemplary aspects of the present invention, a stator assembly is provided that has high insulation reliability.

DETAILED DESCRIPTION OF EMBODIMENTS

First Exemplary Embodiment

A stator assembly according to a first exemplary embodiment of the present invention will be described with reference to the drawings.

(Circuit Configuration of Motor Including Stator Assembly)

Figure 1:
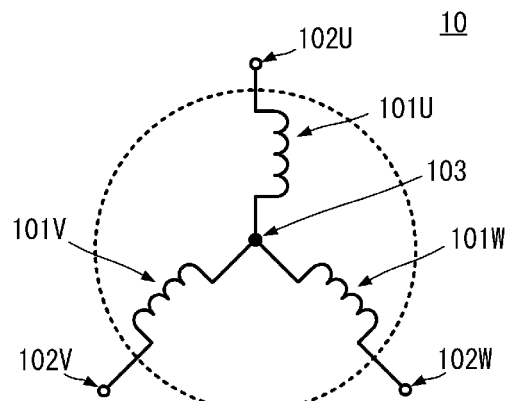
FIG. 1 is an equivalent circuit diagram of a motor including a stator assembly according to a first exemplary embodiment.

FIG. 1 is an equivalent circuit diagram of a motor including a stator assembly according to a first exemplary embodiment.

As illustrated in FIG. 1, the motor including a stator assembly 10 according to the first embodiment is a three-phase AC motor (e.g., a brushless motor) having a U-phase, a V-phase, and a W-phase. The motor includes a U-phase coil 101U, a V-phase coil 101V, and a W-phase coil 101W.

One end of the U-phase coil 101U is connected to an input terminal 102U for a U-phase AC. One end of the V-phase coil 101V is connected to an input terminal 102V for a V-phase AC. One end of the W-phase coil 101W is connected to an input terminal 102W for a W-phase AC.

The other end of each of the U-phase coil 101U, the V-phase coil 101V, and the W-phase coil 101W are connected to a neutral-point 103.

With the circuit configuration above, the motor realizes a Y-connection (e.g., a star connection).

(Structure of Stator Assembly)

Figure 2:
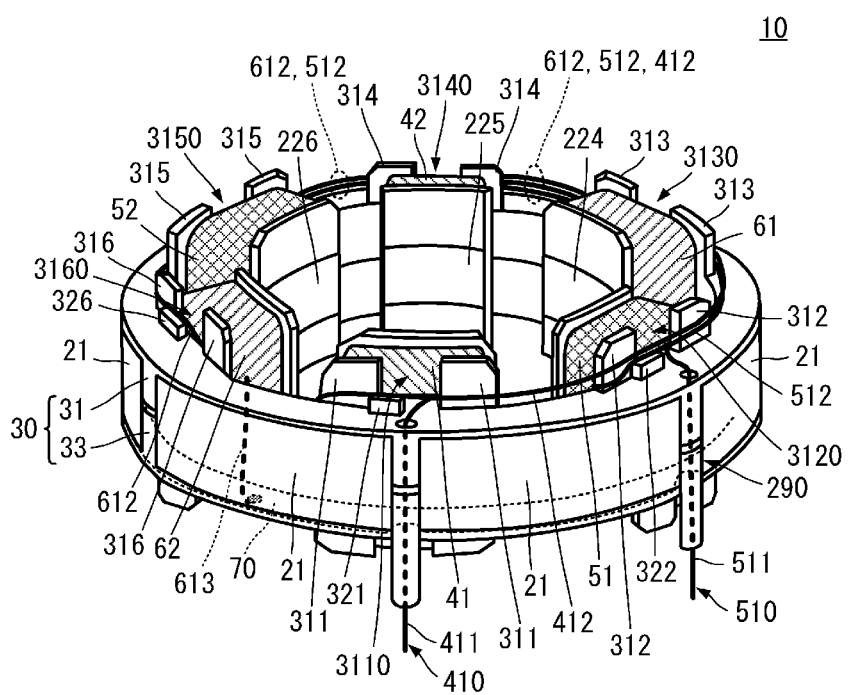
FIG. 2 is a perspective view of the stator assembly according to the first exemplary embodiment.
Figure 3:
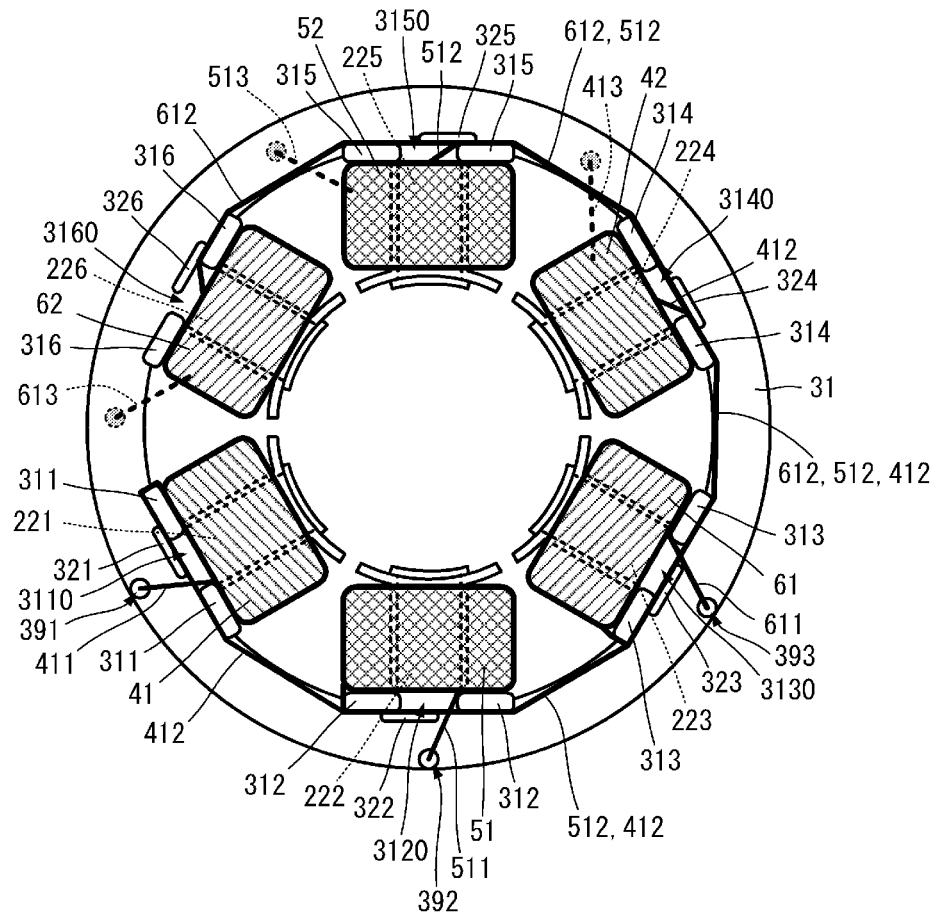
FIG. 3 is a top view of the stator assembly according to the first exemplary embodiment.
Figure 4:
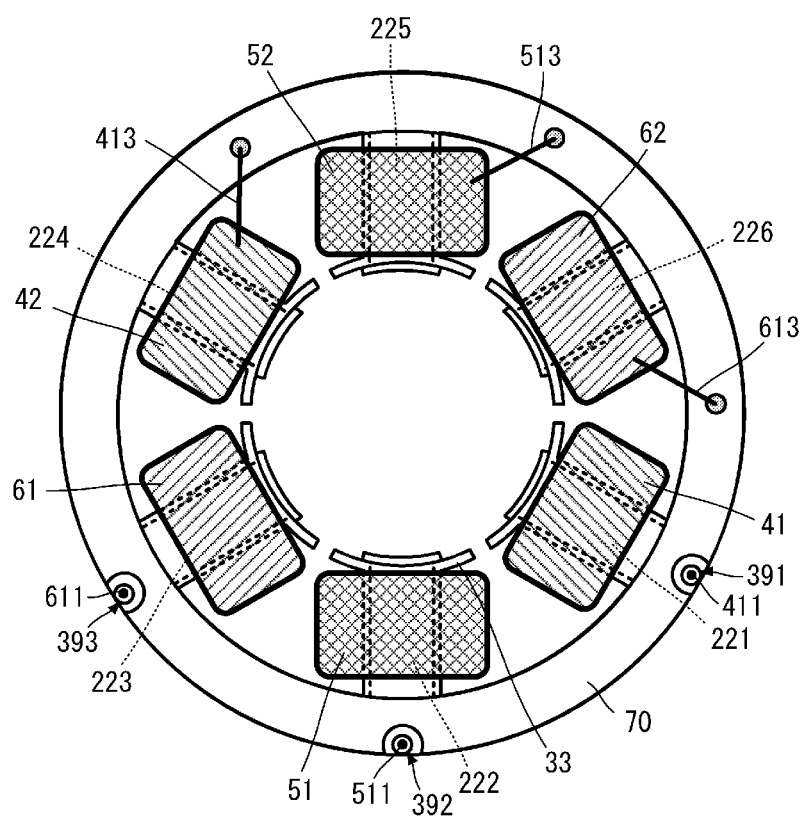
FIG. 4 is a bottom view of the stator assembly according to the first exemplary embodiment.
Figure 5:
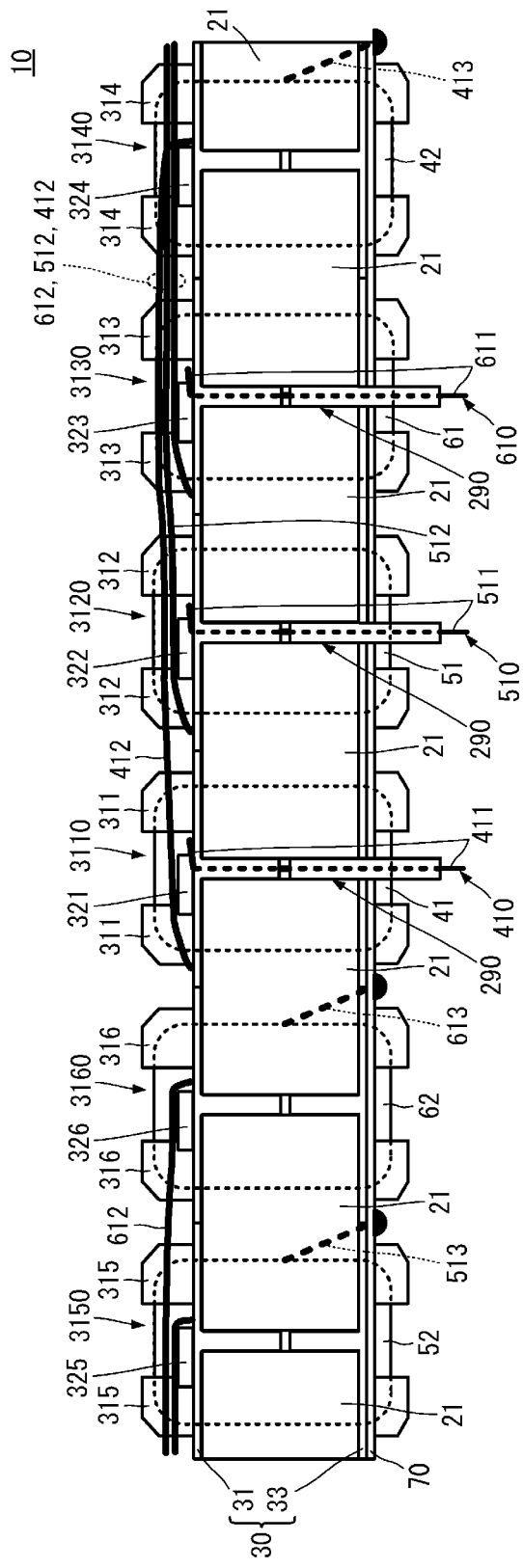
FIG. 5 is a developed side view of the stator assembly according to the first embodiment.

FIG. 2 is a perspective view of the stator assembly according to the first exemplary embodiment. FIG. 3 is a top view of the stator assembly according to the first embodiment. FIG. 4 is a bottom view of the stator assembly according to the first embodiment. FIG. 5 is a developed side view of the stator assembly according to the first embodiment.

As illustrated in FIG. 2, FIG. 3, FIG. 4, and FIG. 5, the stator assembly 10 includes a stator core 21, an insulator 30, a busbar conductor 70, and multiple coil conductors (e.g., coil conductor 410, coil conductor 510, and coil conductor 610). In general, the terms "multiple" and "plurality of" are used interchangeably for purposes of this disclosure.

The stator core 21 includes a back yoke and multiple teeth (e.g., tooth 221, tooth 222, tooth 223, tooth 224, tooth 225, and tooth 226).

In an exemplary aspect, the back yoke is a magnetic body. For example, specifically, the back yoke is formed by laminating multiple electromagnetic steel sheets being a soft magnetic material. Moreover, the back yoke has an annular shape having a predetermined width and height.

The multiple teeth (e.g., tooth 221, tooth 222, tooth 223, tooth 224, tooth 225, and tooth 226) are magnetic bodies that are arranged on an inner side of the back yoke, that is, on a side of a central axis of the annular shape formed by the back yoke. In the exemplary aspect, the multiple teeth are columnar bodies extending from an inner wall surface of the back yoke toward the central axis. The multiple teeth are arranged at predetermined angular intervals. More specifically, as illustrated in FIG. 3 and FIG. 4, tooth 221, tooth 222, tooth 223, tooth 224, tooth 225, and tooth 226 are arranged in this order at angular intervals of approximately 60° counter-clockwise in top view and clockwise in bottom view. The multiple teeth are formed of the same material as the back yoke, for example.

As a result, the stator core 21 is formed by the back yoke and the multiple teeth formed of the same material.

The insulator 30 is made of an insulation material and is disposed to sandwich the stator core 21 from above and below (i.e., from the top and bottom thereof). More specifically, the insulator 30 includes an upper cover 31 and a lower cover 33. The upper cover 31 covers the stator core 21 from a side of a top surface to a predetermined height of a side surface. The lower cover 33 covers the stator core 21 from a side of a bottom surface to a predetermined height of the side surface.

In the exemplary aspect, the insulator 30 includes multiple flanges. More specifically, the upper cover 31 of the insulator 30 includes the multiple flanges (e.g., flange 311, flange 312, flange 313, flange 314, flange 315, and flange 316). Each of the multiple flanges (e.g., flange 311, flange 312, flange 313, flange 314, flange 315, and flange 316) is arranged at a portion, which overlaps with the back yoke of the stator core 21, of the upper cover 31.

Each of the multiple flanges (e.g., flange 311, flange 312, flange 313, flange 314, flange 315, and flange 316) has a shape protruding from a top surface (e.g., a surface on a side opposite to a surface in contact with the back yoke of the stator core 21) of the upper cover 31, and has a plate shape extending along an inner peripheral end of the back yoke of the stator core 21.

The multiple flanges are arranged at a portion of the stator core 21 where the back yoke and each of the multiple teeth are connected. More specifically, the flange 311 is disposed at a portion where the back yoke and the tooth 221 are connected, the flange 312 is disposed at a portion where the back yoke and the tooth 222 are connected, and the flange 313 is disposed at a portion where the back yoke and the tooth 223 are connected. The flange 314 is disposed at a portion where the back yoke and the tooth 224 are connected, the flange 315 is disposed at a portion where the back yoke and the tooth 225 are connected, and the flange 316 is disposed at a portion where the back yoke and the tooth 226 are connected.

As further shown, the flange 311 has a recess 3110 that divides the flange 311 into two, the flange 312 has a recess 3120 that divides the flange 312 into two, and the flange 313 has a recess 3130 that divides the flange 313 into two. The flange 314 has a recess 3140 that divides the flange 314 into two, the flange 315 has a recess 3150 that divides the flange 315 into two, and the flange 316 has a recess 3160 that divides the flange 316 into two.

According to the exemplary aspect, the insulator 30 includes multiple protrusions. More specifically, the upper cover 31 of the insulator 30 includes multiple protrusions (e.g., protrusion 321, protrusion 322, protrusion 323, protrusion 324, protrusion 325, and protrusion 326) that each has a shape protruding from the top surface of the upper cover 31 (e.g., the surface on the side opposite to the surface in contact with the back yoke of the stator core 21). The multiple protrusions are arranged outward of the multiple flanges.

In side view of the insulator 30, the multiple protrusions are arranged to overlap with part of the recess of each of the multiple flanges. More specifically, the protrusion 321 overlaps with part of the recess 3110 of the flange 311, the protrusion 322 overlaps with part of the recess 3120 of the flange 312, and the protrusion 323 overlaps with part of the recess 3130 of the flange 313. The protrusion 324 overlaps with part of the recess 3140 of the flange 314, the protrusion 325 overlaps with part of the recess 3150 of the flange 315, and the protrusion 326 overlaps with part of the recess 3160 of the flange 316.

As illustrated in FIG. 3 and FIG. 4, the insulator 30 has a plurality of through-holes, for example, a through-hole 391, a through-hole 392, and a through-hole 393. Each of the through-hole 391, the through-hole 392, and the through-hole 393 passes through the insulator 30 (e.g., the upper cover 31 and lower cover 33) from the top surface to the bottom surface.

A hollow 290 is formed outside a portion of the stator core 21 where the back yoke and each of the multiple teeth are connected, and each of the through-hole 391, the through-hole 392, and the through-hole 393 is formed in a portion disposed in the hollow 290 of the insulator 30. More specifically, the through-hole 391 is formed in the insulator 30 at the hollow 290 in a portion of the stator core 21 where the back yoke and the tooth 221 are connected, the through-hole 392 is formed in the insulator 30 at the hollow 290 in a portion of the stator core 21 where the back yoke and the tooth 222 are connected, and the through-hole 393 is formed in the insulator 30 at the hollow 290 in a portion of the stator core 21 where the back yoke and the tooth 223 are connected.

As further shown in FIG. 4, for example, the busbar conductor 70 is an annular flat plate having a predetermined width. The busbar conductor 70 overlaps with the back yoke of the stator core 21 in top view or bottom view. The busbar conductor 70 is disposed on a surface of the lower cover 33 of the insulator 30, that is, on a surface opposite to a side where the insulator 30 is in contact with the back yoke of the stator core 21.

Each of the multiple coil conductors is formed of a single conductor, and the single conductor is formed of a terminal wiring conductor, multiple tooth conductors, a bridging line conductor, and a neutral-point connection conductor.

More specifically, the coil conductor 410 is formed of a single conductor, and as a functional portion, the single conductor is formed of a terminal wiring conductor 411, a first tooth conductor 41, a bridging line conductor 412, a second tooth conductor 42, and a neutral-point connection conductor 413. The coil conductor 510 is formed of a single conductor, and as a functional portion, the single conductor is formed of a terminal wiring conductor 511, a first tooth conductor 51, a bridging line conductor 512, a second tooth conductor 52, and a neutral-point connection conductor 513. The coil conductor 610 is formed of a single conductor, and as a functional portion, the single conductor is formed of a terminal wiring conductor 611, a first tooth conductor 61, a bridging line conductor 612, a second tooth conductor 62, and a neutral-point connection conductor 613.

(Specific Arrangement (Routing) of Coil Conductor 410)

According to an exemplary aspect, the coil conductor 410 is disposed as follows.

The terminal wiring conductor 411 is inserted through the through-hole 391 and routed from a lower side to an upper side of the back yoke of the stator core 21. Furthermore, the terminal wiring conductor 411 passes over the top surface of a portion of the insulator 30 that overlaps with the back yoke of the stator core 21, passes through the recess 3110, is led to a side of the tooth 222 of the tooth 221, and is connected to the first tooth conductor 41.

The first tooth conductor 41 is wound around the tooth 221 with the insulator 30 interposed therebetween. An end portion of the first tooth conductor 41, on a side opposite to a side connected to the terminal wiring conductor 411, is routed to a side of a top surface of a portion where the insulator 30 overlaps with the back yoke of the stator core 21, along a side end of the flange 311 on a side of the tooth 226. The end portion above is connected to the bridging line conductor 412.

As further shown, the bridging line conductor 412 is routed to the side of the tooth 222 through the outer surface of the flange 311 and above a top surface of the protrusion 321. The bridging line conductor 412 is routed to a portion of the flange 314 on a side of the flange 313 along outer surfaces of the flange 312 and the flange 313, in substantially an arc shape as same as a shape of the back yoke of the stator core 21. The bridging line conductor 412 passes through the recess 3140 from an outer surface of a portion of the flange 314 on the side of the flange 313, is led to the tooth 224 on a side of the tooth 225, and is connected to the second tooth conductor 42.

The second tooth conductor 42 is wound around the tooth 224 with the insulator 30 interposed therebetween. An end portion of the second tooth conductor 42, on a side opposite to a side connected to the bridging line conductor 412, is drawn out to a lower side of the tooth 224, and is connected to the neutral-point connection conductor 413.

The neutral-point connection conductor 413 is routed to a position of the busbar conductor 70 between the tooth 224 and the tooth 225, and is connected to the busbar conductor 70 by a conductive bonding material or the like.

(Specific Arrangement (Routing) of Coil Conductor 510)

According to an exemplary aspect, the coil conductor 510 is disposed as follows.

The terminal wiring conductor 511 is inserted through the through-hole 392 and routed from the lower side to the upper side of the back yoke of the stator core 21. Furthermore, the terminal wiring conductor 511 passes over the top surface of a portion of the insulator 30 that overlaps with the back yoke of the stator core 21, passes through the recess 3120, is led to a side of the tooth 223 of the tooth 222, and is connected to the first tooth conductor 51.

The first tooth conductor 51 is wound around the tooth 222 with the insulator 30 interposed therebetween. An end portion of the first tooth conductor 51, on a side opposite to a side connected to the terminal wiring conductor 511, is routed to the side of the top surface of the portion where the insulator 30 overlaps with the back yoke of the stator core 21, along a side end of the flange 312 on a side of the tooth 221. The end portion above is connected to the bridging line conductor 512.

The bridging line conductor 512 is routed to the side of the tooth 223 through the outer surface of the flange 312 and above a top surface of the protrusion 322. The bridging line conductor 512 is routed to a portion of the flange 315 on a side of the flange 314 along outer surfaces of the flange 313 and the flange 314, in substantially an arc shape as same as the shape of the back yoke of the stator core 21. The bridging line conductor 512 passes through the recess 3150 from the outer surface of a portion of the flange 315 on the side of the flange 314, is led to the tooth 225 on the side of the tooth 226, and is connected to the second tooth conductor 52.

Moreover, the second tooth conductor 52 is wound around the tooth 225 with the insulator 30 interposed therebetween. An end portion of the second tooth conductor 52, on a side opposite to a side connected to the bridging line conductor 512, is drawn out to a lower side of the tooth 225, and is connected to the neutral-point connection conductor 513.

The neutral-point connection conductor 513 is routed to a position of the busbar conductor 70 between the tooth 225 and the tooth 226, and is connected to the busbar conductor 70 by a conductive bonding material or the like.

(Specific Arrangement (Routing) of Coil Conductor 610)

According to an exemplary aspect, the coil conductor 610 is disposed as follows.

The terminal wiring conductor 611 is inserted through the through-hole 393 and routed from the lower side to the upper side of the back yoke of the stator core 21. Furthermore, the terminal wiring conductor 611 passes over the top surface of a portion of the insulator 30 that overlaps with the back yoke of the stator core 21, passes through the recess 3130, is led to a side of the tooth 224 of the tooth 223, and is connected to the first tooth conductor 61.

The first tooth conductor 61 is wound around the tooth 223 with the insulator 30 interposed therebetween. An end portion of the first tooth conductor 61, on a side opposite to a side connected to the terminal wiring conductor 611, is routed to the side of the top surface of the portion where the insulator 30 overlaps with the back yoke of the stator core 21, along a side end of the flange 313 on the side of the tooth 222. The end portion above is connected to the bridging line conductor 612.

The bridging line conductor 612 is routed to the side of the tooth 224 through the outer surface of the flange 313 and above a top surface of the protrusion 323. The bridging line conductor 612 is routed to a portion of the flange 316 on a side of the flange 315 along outer surfaces of the flange 314 and the flange 315, in substantially an arc shape as same as the shape of the back yoke of the stator core 21. The bridging line conductor 612 passes through the recess 3160 from the outer surface of a portion of the flange 316 on the side of the flange 315, is led to the tooth 226 on the side of the tooth 221, and is connected to the second tooth conductor 62.

The second tooth conductor 62 is wound around the tooth 226 with the insulator 30 interposed therebetween. An end portion of the second tooth conductor 62, on a side opposite to a side connected to the bridging line conductor 612, is drawn out to a lower side of the tooth 226, and is connected to the neutral-point connection conductor 613.

The neutral-point connection conductor 613 is routed to a position of the busbar conductor 70 between the tooth 226 and the tooth 221, and is connected to the busbar conductor 70 by a conductive bonding material or the like.

In the configuration above, tooth 221 and tooth 224 are designated as U-phase teeth, and the coil conductor 410 is designated as a U-phase coil conductor, for example. Moreover, tooth 222 and tooth 225 are designated as V-phase teeth, and the coil conductor 510 is designated as a V-phase coil conductor. Finally, tooth 223 and tooth 226 are designated as W-phase teeth, and the coil conductor 610 is designated as a W-phase coil conductor. As a result, the stator assembly 10 provides the circuit connection illustrated in FIG. 1 described above. It should be appreciate that while only one pair of teeth is shown for each of the three phases, the number of teeth for each phase can be any number n of teeth, with n being a number greater than or equal to two according to alternative exemplary embodiments.

Moreover, in the configuration above, portions of multiple coil conductors to be made bridge between multiple teeth are routed to a side of a top surface of the back yoke of the stator core 21 and the insulator 30, and portions to connect teeth to a neutral-point are routed from the teeth through an inside of the back yoke to a side of a bottom surface of the back yoke of the stator core 21 and the insulator 30. Further, portions of the multiple coil conductors from terminals to the teeth are arranged routing from an outer surface to the top surface of the insulator 30. This configuration suppresses arrangement of portions of multiple coil conductors having a large electric potential difference in proximity to each other. Accordingly, the stator assembly 10 provides high insulation reliability.

Further, in the configuration above, since the bridging line conductor 412 passes through a side of a top surface of the protrusion 321 and the terminal wiring conductor 411 passes through a side of a side surface of the protrusion 321, the bridging line conductor 412 and the terminal wiring conductor 411 may be separated from each other with a predetermined distance. Since the bridging line conductor 512 passes through a side of a top surface of the protrusion 322 and the terminal wiring conductor 511 passes through a side of a side surface of the protrusion 322, the bridging line conductor 512 and the terminal wiring conductor 511 may be separated from each other with a predetermined distance. Since the bridging line conductor 612 passes through a side of a top surface of the protrusion 323 and the terminal wiring conductor 611 passes through a side of a side surface of the protrusion 323, the bridging line conductor 612 and the terminal wiring conductor 611 may be separated from each other with a predetermined distance.

As a result, both ends of the first tooth conductor 41 do not come into contact with each other when they cross, and arrangement in proximity may be suppressed. Similarly, both ends of the first tooth conductor 51 do not come into contact with each other when they cross, and arrangement in proximity may be suppressed. Further, both ends of the first tooth conductor 61 do not come into contact with each other when they cross, and arrangement in proximity may be suppressed. Accordingly, the stator assembly 10 achieves higher insulation reliability.

Further, in the configuration above, the bridging line conductor 412 and the bridging line conductor 512 are arranged parallel to each other in a section from the flange 312 to an end portion of the flange 313 on a side of the flange 312. The bridging line conductor 412, the bridging line conductor 512, and the bridging line conductor 612 are arranged parallel to each other in a section from the flange 313 to a portion of the flange 314 on the side of the flange 313. The bridging line conductor 512 and the bridging line conductor 612 are arranged parallel to each other in a section from a portion of the flange 314 on the side of the flange 315 to a portion of the flange 315 on the side of the flange 314. As described above, the multiple coil conductors that form the different phases are routed in parallel with each other, and all the multiple coil conductors are ending terminals of the tooth conductors. The electric potential difference between the ending terminals of the tooth conductors is smaller than the electric potential difference between a starting terminal and the ending terminal of each tooth conductor. Accordingly, even when there is a portion where the tooth conductors are arranged in parallel with each other, problem in insulation does not occur. As a result, the stator assembly 10 achieves higher insulation reliability.

Further, in the configuration above, the terminal wiring conductor 411, the terminal wiring conductor 511, and the terminal wiring conductor 611 each are routed from a side of a top surface to a side of a bottom surface of the stator core 21 and the insulator 30 through the through-hole 391, the through-hole 392, and the through-hole 393 of the insulator 30. As a result, a drive signal application terminal may be disposed on a side of a bottom surface of the stator assembly 10. Accordingly, the drive signal application terminal can be disposed to be separated from the bridging line conductor of each of the multiple coil conductors.

At this time, in the stator assembly 10, a short circuit may be suppressed between the stator core 21 and each of the terminal wiring conductor 411, the terminal wiring conductor 511, and the terminal wiring conductor 611 by insertion of the wiring conductors into the through-hole 391, the through-hole 392, and the through-hole 393.

(Method for Assembling Stator Assembly 10)

The stator assembly 10 having the above-described configuration is assembled as follows, for example. FIG. 6(A), FIG. 6(B), FIG. 6(C), and FIG. 6(D) are top views illustrating respective states in a manufacturing process of the stator assembly according to the first embodiment. Note that, in FIG. 6(A), FIG. 6(B), FIG. 6(C), and FIG. 6(D), reference signs are omitted as appropriate to facilitate viewing drawings, and reference signs not illustrated in FIG. 6(A), FIG. 6(B), FIG. 6(C), and FIG. 6(D) will be described with reference to FIG. 4.

The stator core 21 including a back yoke and multiple teeth is prepared, and the insulator 30 is attached to the core.

Figure 6A:
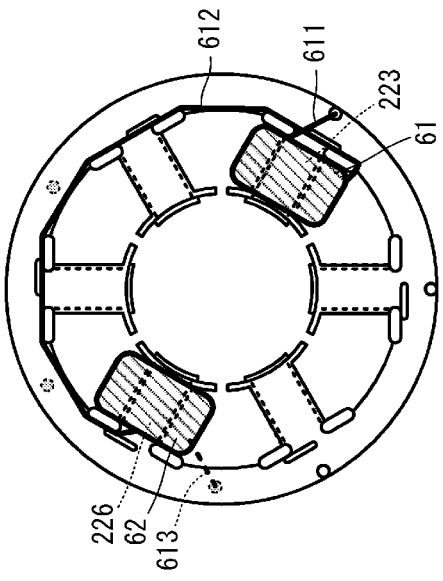
FIG. 6(A), FIG. 6(B), FIG. 6(C), and FIG. 6(D) are top views illustrating respective states in a manufacturing process of the stator assembly according to the first exemplary embodiment.

As illustrated in FIG. 6(A), the coil conductor 610 (i.e., terminal wiring conductor 611) is inserted into the through-hole 393, is passed through the recess 3130, and is led to the tooth 223. The coil conductor 610 (i.e., first tooth conductor 61) is wound around the tooth 223 with the insulator 30 interposed therebetween.

Figure 6B:
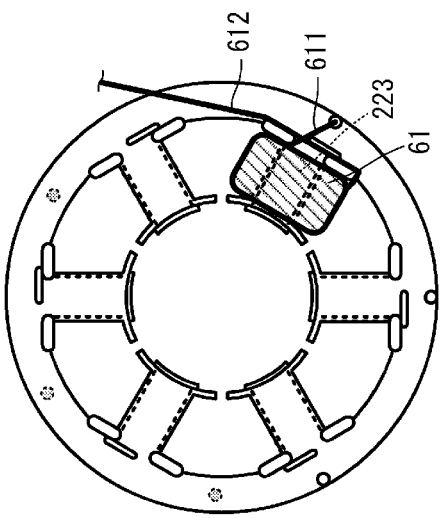

As illustrated in FIG. 6(B), the coil conductor 610 (i.e., bridging line conductor 612) is wired along the flange 313, the flange 314, the flange 315, and a portion of the flange 316 on the side of the flange 315, is passed through the recess 3160, and is led to the tooth 226. The coil conductor 610 (i.e., second tooth conductor 62) is wound around the tooth 226 with the insulator 30 interposed therebetween. The coil conductor 610 (i.e., neutral-point connection conductor 613) is drawn out to a lower side of the tooth 226.

Figure 6C:
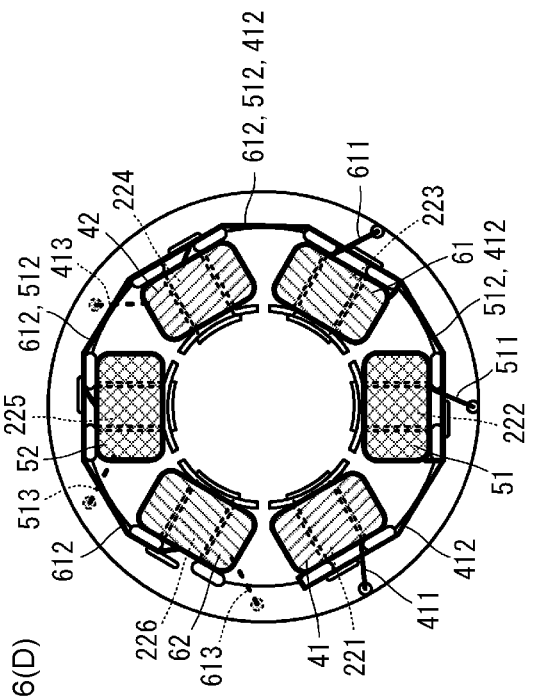

The coil conductor 510 is wound around the tooth 222, adjacent to the tooth 223 around which the coil conductor 610 is wound, on a side opposite to a side from which the bridging line conductor 612 is drawn out. Specifically, as illustrated in FIG. 6(C), the coil conductor 510 (i.e., terminal wiring conductor 511) is inserted into the through-hole 392, is passed through the recess 3120, and is led to the tooth 222. The coil conductor 510 (i.e., first tooth conductor 51) is wound around the tooth 222 with the insulator 30 interposed therebetween.

As illustrated in FIG. 6(C), the coil conductor 510 (i.e., bridging line conductor 512) is wired along the flange 312, the flange 313, the flange 314, and a portion of the flange 315 on the side of the flange 314, is passed through the recess 3150, and is led to the tooth 225. The coil conductor 510 (i.e., second tooth conductor 52) is wound around the tooth 225 with the insulator 30 interposed therebetween. The coil conductor 510 (i.e., neutral-point connection conductor 513) is drawn out to a lower side of the tooth 225.

Figure 6D:
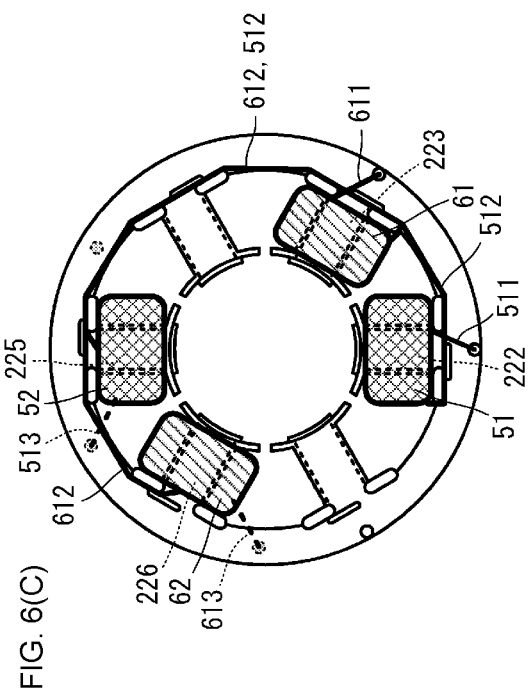

The coil conductor 410 is wound around the tooth 221, adjacent to the tooth 222 around which the coil conductor 510 is wound, on a side opposite to a side from which the bridging line conductor 512 is drawn out. Specifically, as illustrated in FIG. 6(D), the coil conductor 410 (i.e., terminal wiring conductor 411) is inserted into the through-hole 391, is passed through the recess 3110, and is led to the tooth 221. The coil conductor 410 (i.e., first tooth conductor 41) is wound around the tooth 221 with the insulator 30 interposed therebetween.

As illustrated in FIG. 6(D), the coil conductor 410 (i.e., bridging line conductor 412) is wired along the flange 311, the flange 312, the flange 313, and a portion of the flange 314 on the side of the flange 313, is passed through the recess 3140, and is led to the tooth 224. The coil conductor 410 (i.e., second tooth conductor 42) is wound around the tooth 224 with the insulator 30 interposed therebetween. The coil conductor 410 (i.e., neutral-point connection conductor 413) is drawn out to a lower side of the tooth 224.

The coil conductor 410 (i.e., neutral-point connection conductor 413), the coil conductor 510 (i.e., neutral-point connection conductor 513), and the coil conductor 610 (i.e., neutral-point connection conductor 613) each are connected to the busbar conductor 70.

That is, each of the coil conductor 410, the coil conductor 510, and the coil conductor 610 forming each phase is wound in order in an annular shape. At this time, as a tooth around which a first tooth conductor is wound in a coil conductor of each phase, there is used a tooth, with respect to a tooth around which an already wound first tooth conductor of a different phase is wound, on a side opposite to a side at which a bridging line conductor is wired from the first tooth conductor to a second tooth conductor of the different phase. As a result, with the configuration above, even in a configuration in which the bridging line conductors of the respective phases are arranged in parallel and the tooth conductors of the respective phases are arranged in order in an annular shape, the coil conductors of the respective phases may easily and reliably be wound.

By using the assembling method above, the stator assembly 10 having the above-described configuration may easily be assembled.

Second Exemplary Embodiment

A stator assembly according to a second exemplary embodiment of the present invention will be described with reference to the drawing.

Figure 7:
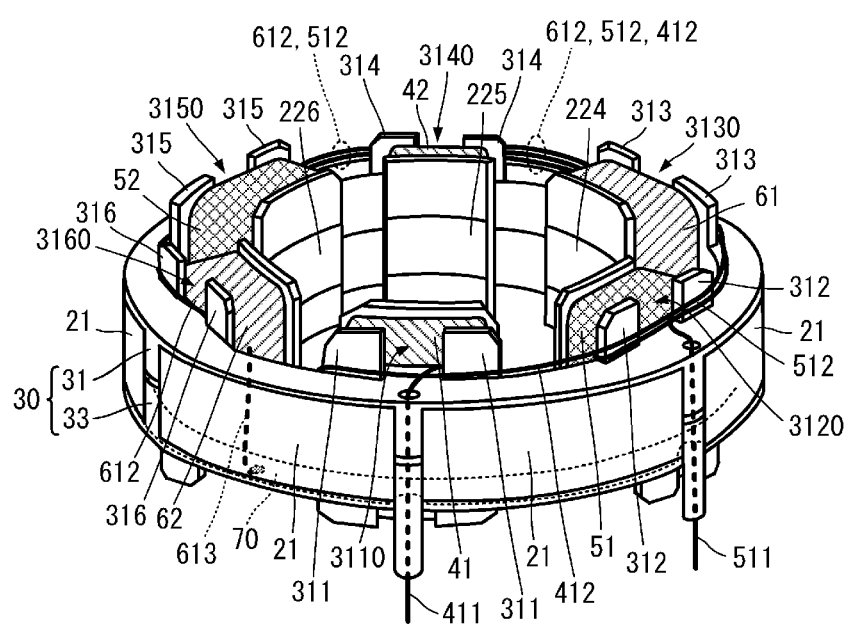
FIG. 7 is a perspective view of a stator assembly according to a second exemplary embodiment.

FIG. 7 is a perspective view of the stator assembly according to the second embodiment. As illustrated in FIG. 7, a stator assembly 10A according to the second embodiment is different from the stator assembly 10 according to the first embodiment in that the multiple protrusions are omitted. Other configurations of the stator assembly 10A are the same as those of the stator assembly 10, and description of the same portions will be omitted.

Even with the configuration above, the stator assembly 10A may inhibit arrangement of the portions of the multiple coil conductors that form respective phases having the largest voltage difference in proximity to each other, thereby achieving high insulation reliability.

Note that, in the description above, an aspect has been described in which teeth and coil conductors of 3 phases×2 pieces are used. However, the configuration above such as the routing of the bridging line conductor may also be applied to an aspect in which teeth and coil conductors of 3 phases×m pieces=N pieces (i.e., each of m and N being a natural number) are used.

REFERENCE SIGNS LIST 10, 10A STATOR ASSEMBLY
21 STATOR CORE
30 INSULATOR
31 UPPER COVER
33 LOWER COVER
41 FIRST TOOTH CONDUCTOR
42 SECOND TOOTH CONDUCTOR
51 FIRST TOOTH CONDUCTOR
52 SECOND TOOTH CONDUCTOR
61 FIRST TOOTH CONDUCTOR
62 SECOND TOOTH CONDUCTOR
70 BUSBAR CONDUCTOR
101U U-PHASE COIL
101V V-PHASE COIL
101W W-PHASE COIL
102U, 102V, 102W INPUT TERMINAL
103 NEUTRAL-POINT
221, 222, 223, 224, 225, 226 TOOTH
290 HOLLOW
311, 312, 313, 314, 315, 316 FLANGE
321, 322, 323, 324, 325, 326 PROTRUSION
391, 392, 393 THROUGH-HOLE
410, 510, 610 COIL CONDUCTOR
411, 511, 611 TERMINAL WIRING CONDUCTOR 412, 512, 612 LINE CONDUCTOR
413, 513, 613 NEUTRAL-POINT CONNECTION CONDUCTOR
3110, 3120, 3130, 3140, 3150, 3160 RECESS

The invention claimed is:

1. A stator assembly, comprising:
a stator core including a back yoke disposed in an annular shape and a plurality of teeth extending from the back yoke toward a central axis of the annular shape;
an insulator disposed to sandwich the stator core from a top and bottom thereof; and
a coil conductor wound around a portion of the insulator that covers the plurality of teeth,
wherein the plurality of teeth include N teeth from a first tooth to an N-th tooth for each of a U-phase, a V-phase, and a W-phase, which are repeatedly arranged in order along the annular shape, where N is a natural number,
wherein the coil conductor includes a respective coil conductor for each of the U-phase, the V-phase, and the W-phase,
wherein the coil conductor in each phase has a first end configured as a terminal wiring conductor and a second end configured as a neutral-point connection conductor, and the terminal wiring conductor and the neutral-point connection conductor are connected by tooth conductors wound around teeth among the N teeth and a bridging line conductor that bridges the tooth conductors wound around the teeth,
wherein the terminal wiring conductor is connected to a first tooth conductor among the N teeth at an upper side of the insulator,
wherein the bridging line conductor is disposed on the upper side of the insulator disposed on the stator core and is disposed along an outer side of a tooth of a different phase, and
wherein the neutral-point connection conductor is connected to an N-th tooth conductor among the N teeth at a lower side of the insulator.

2. The stator assembly according to claim 1, wherein the plurality of teeth are successively arranged in an annular shape in a top view in an order of a first U-phase tooth, a first V-phase tooth, and a first W-phase tooth to an N-th U-phase tooth, an N-th V-phase tooth, and an N-th W-phase tooth.

3. The stator assembly according to claim 2,
wherein the coil conductor includes a U-phase coil conductor, a V-phase coil conductor, and a W-phase coil conductor, and
wherein:
the U-phase coil conductor includes a U-phase bridging line conductor that connects a 1U-phase tooth conductor wound around the first U-phase tooth to an NU-phase tooth conductor wound around the N-th U-phase tooth,
the V-phase coil conductor includes a V-phase bridging line conductor that connects a 1V-phase tooth conductor wound around the first V-phase tooth to an NV-phase tooth conductor wound around the N-th V-phase tooth, and
the W-phase coil conductor includes a W-phase bridging line conductor that connects a 1W-phase tooth conductor wound around the first W-phase tooth to an NW-phase tooth conductor wound around the N-th W-phase tooth.

4. The stator assembly according to claim 3, wherein the U-phase bridging line conductor, the V-phase bridging line conductor, and the W-phase bridging line conductor are routed in a direction in an order in which the N-th W-phase tooth and the N-th V-phase tooth are arranged.

5. The stator assembly according to claim 1, wherein the insulator includes a plurality of flanges that protrude from a top surface of portions overlapping with the stator core and from which the plurality of teeth protrude.

6. The stator assembly according to claim 5, wherein each of the plurality of flanges has a recess at a center.

7. The stator assembly according to claim 6, wherein the terminal wiring conductor is led to a side of a tooth of the plurality of teeth through the recess.

8. The stator assembly according to claim 7, wherein the bridging line conductor is disposed along outer surfaces of the plurality of flanges.

9. The stator assembly according to claim 7, wherein:
the insulator includes a protrusion lower than the flanges in part of a portion overlapping with the recess,
the terminal wiring conductor is disposed on a side of a side surface of the protrusion, and
the bridging line conductor is disposed on a side of a top surface of the protrusion.

10. The stator assembly according to claim 1, further comprising bridging lines of the respective phases that are arranged parallel to each other.

11. The stator assembly according to claim 1, wherein the insulator includes a through-hole extending from a top surface to a bottom surface of the insulator at a position on an outer side portion of a tooth of the plurality of teeth.

12. The stator assembly according to claim 11, wherein the terminal wiring conductor is inserted through the through-hole.

13. The stator assembly according to claim 1, further comprising a busbar conductor having an annular shape and disposed on a bottom surface of the insulator.

14. The stator assembly according to claim 13, wherein the neutral-point connection conductor is connected to the busbar conductor.

15. The stator assembly according to claim 1, wherein the back yoke is a magnetic body.

16. The stator assembly according to claim 1, wherein the plurality of teeth are columnar bodies extending from an inner wall surface of the back yoke toward the central axis of the annular shape.

17. A stator assembly, comprising:
a stator core including a back yoke having an annular shape and a plurality of teeth that extend from the back yoke toward a central axis of the annular shape;
an insulator that sandwiches the stator core; and
a plurality of coil conductors wound around a portion of the insulator that covers the plurality of teeth, respectively,
wherein the plurality of teeth include a plurality teeth having a U-phase, a plurality teeth having a V-phase, and a plurality of teeth having a W-phase, which are alternately arranged in order along the annular shape,
wherein the plurality of coil conductors in each phase each have a first end configured as a terminal wiring conductor and a second end configured as a neutral-point connection conductor, and the terminal wiring conductor and the neutral-point connection conductor are connected by tooth conductors wound around respective teeth and a bridging line conductor that bridges the tooth conductors wound around the teeth,
wherein the terminal wiring conductor is connected to a first tooth conductor of the plurality of teeth at an upper side of the insulator, and wherein the bridging line conductor is disposed on the upper side of the insulator disposed on the stator core and is disposed along an outer side of a tooth of a different phase.

18. The stator assembly according to claim 17, further comprising a busbar conductor having an annular shape and disposed on a bottom surface of the insulator, with the busbar conductor being connected to the neutral-point connection conductor.

19. A method for assembling a stator assembly that includes a stator core having a back yoke disposed in an annular shape and a plurality of teeth extending from the back yoke toward a central axis of the annular shape, an insulator sandwiching the stator core from a top and a bottom thereof, and a coil conductor wound around a portion of the insulator that covers the plurality of teeth, the method comprising:

configuring the plurality of teeth with N teeth from a first tooth to an N-th tooth for each of a U-phase, a V-phase, and a W-phase, and arranging the teeth of each phase repeatedly in order along the annular shape, where N is a natural number;

connecting a terminal wiring conductor and a neutral-point connection conductor, in which the terminal wiring conductor and the neutral-point connection conductor each are configured as a first end and a second end of the coil conductor of each of the U-phase, the V-phase, and the W-phase, by tooth conductors wound around teeth among the N teeth and a bridging line conductor that bridges the tooth conductors wound around the teeth;

connecting the terminal wiring conductor to a first tooth conductor among the N teeth at an upper side of the insulator;

disposing the bridging line conductor on an upper side of the insulator disposed on the stator core, and along an outer side portion of a tooth of a different phase; and connecting the neutral-point connection conductor to an N-th tooth conductor among the N teeth at a lower side of the insulator.

20. The method for assembling a stator assembly according to claim 19, further comprising winding a first tooth conductor of a phase to be newly wound around a tooth disposed adjacent to a tooth, around which a first tooth conductor of a different phase has already been wound, on a side opposite to a side on which a bridging line conductor is wired from the first tooth conductor of the other phase to a next tooth conductor of the other phase.

* * * * *